Dec. 12, 1961 R. BLAFIELD 3,012,433
BOILER AND CONDENSER TUBE TESTER
Filed Dec. 21, 1956
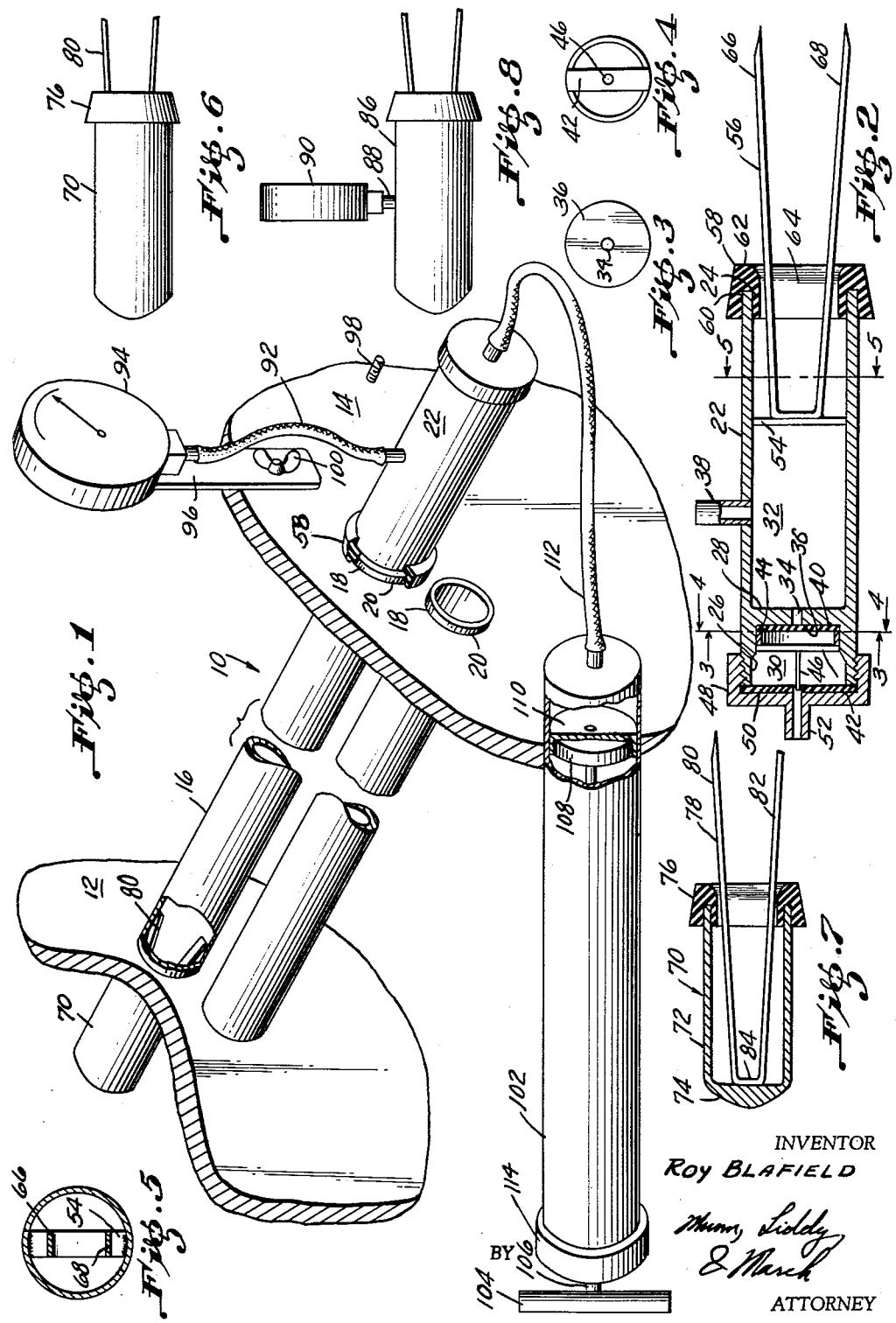
INVENTOR
Roy BLAFIELD
ATTORNEY

United States Patent Office 3,012,433
Patented Dec. 12, 1961

3,012,433
BOILER AND CONDENSER TUBE TESTER
Roy Blafield, Baltimore, Md.
(2743 Jaynia Place, Lemon Grove, Calif.)
Filed Dec. 21, 1956, Ser. No. 629,979
6 Claims. (Cl. 73—40.5)

This invention relates to test apparatus and in particular to an apparatus designed for testing boiler, condenser, or the like tubes for leaks. The standard procedures for testing boiler and condenser tubes involve at least three men and a considerable length of time. Further the testing procedures used require very careful manipulation, are tedious, and unsatisfactory results are frequently obtained. For example one type of standard test procedure for condensers requires the aeration of the tubes, stoppering of the tubes and the passage of at least two days before the tubes are again opened up. The long shut-down period together with the labor involved and the unreliability of the results has long manifest the need for a better method and apparatus for testing. However, as far as I know there has not heretofore been developed a suitable testing procedure or apparatus which would eliminate or at least minimize some of these difficulties. Accordingly an object of my invention is to provide an apparatus for testing tubes such as condenser and boiler tubes which enables quick accurate testing of tubes.

Yet a further object of the invention is to utilize a vacuum means of tube testing instead of relying on the normal influx or escape of fluids or fluid trapping as in heretofore known testing methods. By a vacuum testing method I mean a method in which the vacuum itself is utilized as an indication of the soundness of the tubes and not as a means of inducing leakage.

Yet a further object of the invention is to provide an apparatus for testing tubes which will test not only the tubes within the sheets but also the seating of the tubes in the sheets.

Another object of the invention is to provide means for testing every possible place that a leak may occur in the tubes including the connection between the tubes and the tube sheets in one operation.

Yet a further object of the invention is to provide a simple testing apparatus involving relatively few parts which will be extremely reliable and not subject to deterioration.

Still another object of the invention is to provide a testing apparatus which is extremely simple to use and will not be subject to unreliability because of fatigue or lack of skill on the part of the users.

Still another object of the invention is to provide a tube testing apparatus with which the tubes can be tested in rapid succession.

A further object of the invention is to provide a tube testing apparatus including means for sealing the ends of the tubes and creating a vacuum within the tubes in a quick and efficient manner.

Yet a further object of the invention is to provide a testing apparatus including means for sealing the ends of condenser tubes and establishing a vacuum therein, including a simple portable vacuum creating device, and in which the total weight of the equipment is extremely light.

Another object of my invention is to provide a testing apparatus adapted to be readily and quickly associated with the tubes and to apply and maintain a vacuum within the tubes, together with indicator means for indicating the degree of the vacuum, and particularly to indicate variations in pressure whereby it can be ascertained whether there is present the slightest leak or fracture within the tubes or about the connection of the tubes with the tube sheets.

These and other objects of the invention will become apparent from the following description and the accompanying drawings in which:

FIGURE 1 is a perspective view showing a portion of a tube system of a refrigerant condenser and the testing apparatus constructed in accordance with the invention associated therewith.

FIGURE 2 is a sectional elevational view of one of the tube sealing elements constructed in accordance with the invention.

FIGURE 3 is a sectional view taken along line 3—3 of FIGURE 2.

FIGURE 4 is a sectional view taken along line 4—4 of FIGURE 2.

FIGURE 5 is a sectional view taken along line 5—5 of FIGURE 2.

FIGURE 6 is an elevational view of another of the tube sealing elements.

FIGURE 7 is a sectional view of the element seen in FIGURE 6, and

FIGURE 8 is a view of another form of tube sealing element.

A tube testing apparatus constructed in accordance with the instant invention is adaptable for testing tubes of any length, whether the ends of the tubes are closely adjacent each other or not, and requires two men only. Yet the apparatus gives a positive indication of leakage or soundness of a tube quickly.

Referring now particularly to the drawings, there is therein shown a refrigerant condenser structure 10. The condenser comprises tube sheets 12 and 14, and the tube sheets support condenser tubes 16. The assembly is accomplished, in one manner, by placing the tubes in mating openings in the sheets and then "rolling" the portions of the tubes within the openings. The latter is a process by which the tubes are expanded within the sheets to provide a secure fluid-tight fit. Often a tube will project outwardly from the tube sheet subsequent to the rolling operation as indicated at 18. The condenser can always leak anywhere along the tubes and also at the point of contact between the tubes and the sheets. Thus any small openings that might remain or any subsequent separation between the tubes and the tube sheet at their connection 20 will be a source of leakage. The problem thus is to devise a testing means for indicating the defects not only in the tubes but also at the contact between the tubes and the tube sheets.

The testing equipment which I have devised comprises a front testing member 22. This is made in the shape of a tube and has an open first end 24 and an open second end 26. A partition 28 divides the tube into an outer compartment 30 and an inner compartment 32. A conduit 34 interconnects the two compartments. The outer face of partition 28 provides a valve seat 36. A second conduit 38 is connected to the housing forming the front testing member and communicates with compartment 32. A valve member 40, which is in the form of a disc, is adjacent seat 36 and is maintained in this position by a cage 42. The cage tightly fits the inner wall of chamber 30 adjacent partition 28 but its inner edge 44 is spaced from the inner wall of the chamber adjacent partition 28. The valve member 40 is thus held in position adjacent the partition 28 by the cage. However, the bottom of the cage is spaced from the valve member sufficiently to permit this member to flutter in accordance with the changes in pressure as described hereinafter. The cage is also pervious to permit free flow of air through the cage. The cage has a projecting stem 46.

A cover 48 is threadingly engaged with the housing of member 22 and a washer 50 provided within cover 48 insures an air-tight fit. The cover is provided with a stem 52 which has a central opening. The washer 50 has a similar opening. The stem 46 is normally received within the central opening of the washer and stem 52 when the elements are assembled as in FIGURE 2. The stem 46 is of a smaller size than the openings in the washer 50 and the stem 52 and can be received within the latter two openings without preventing the free flow of air through stem 52 and washer 50.

A spring support 54 is connected to the housing of the testing member 22. The support extends laterally across the inside of the housing. Spring test member support and positioning element 56 is attached to spring support 54, the connection between the two members being preferably provided by brazing or welding. Spring test member support and positioning element 56 comprises a piece of spring steel formed as shown.

A sealing member 58 is mounted on housing 22 at its open end 24. The sealing element comprises a means for maintaining the association of the element with the housing and in the form illustrated this is accomplished by means of a cylindrical slot 60 in which the tubular wall 22 is received. The sealing member has a flattened outer cylindrical surface 62. The sealing member is formed of a rubbery composition and is impervious to the flow of fluids. This is also true of the valve member 40. The central opening 64 of the sealing member is preferably of a sufficient size to clear the legs 66, 68 of the spring test member support and positioning element 56.

Rear testing member 70 comprises a cylindrical housing 72 formed similar to the housing 22. The housing 72 however has one end closed by an end piece 74. At its opposite end the housing supports a sealing member 76 formed identical to sealing member 58. Also a spring test member support and positioning element 78 comprising the two legs 80 and 82 is mounted within testing member 70 with the base 84 of the positioning element being secured to the end piece 74 by welding or brazing.

FIGURE 8 illustrates another form of rear testing member 86 constructed identically as member 70 except that it is provided with a conduit 88 communicating with the interior thereof. A vacuum gage 90 is connected to conduit 88.

A flexible conduit 92 is connected to conduit 38 and a vacuum gage 94 is connected to the opposite end of conduit 92. A bracket 96 is secured to the housing of gage 94. The bracket has an opening adapted to cooperate with screws 98 positioned at spaced intervals on the tube sheet. By placing the bracket over the screws and utilizing thumb screw 100 the gage 94 can be fastened on the tube sheet during use of the testing equipment.

A hand pump 102 which comprises the usual operating handle 104, rod 106, and piston and packing 108 and 110, respectively, is connected to stem 52 by a flexible tubing 112. The packing 110 is positioned in reverse position from that in which it would normally be in a pressure pump so that as the piston is retracted air will be drawn out of the interior of chamber 32. When the piston is forced inwardly of the pump, valve 40 will seat on valve seat 36, and the air will flow by the packing and out through the usual opening in the cap 114. Continued action of the pump thus can result in evacuation of chamber 32 and a tube 16 connected thereto.

FIGURE 1 illustrates the elements associated with a tube to be tested. It is seen that the spring test member support and positioning elements 56 and 78 are inserted within the tube and maintain the testing members in association with the tube. Furthermore the opening 64 is of a size to surround the tube end construction 18 and the connection 20 between the tube and the tube sheet. Obviously as the tubes vary in size members 22 and 70 of conformable sizes would have to be used.

Method of testing

The tube testing members are placed in position with the members 58 and 76 firmly seated against the sheets and the tube exterior exposed to atmospheric pressure. The pump is then operated several times, whereupon the gage 94 will indicate the vacuum created. It can instantly be determined whether or not there is any leakage as the vacuum will immediately fall off for even the slightest leakage. The gage is examined for a short while, and if the pressure remains the same the tube is sound. The front and rear members can be then immediately removed and inserted in the next tube. For use with long tubes as in larger boilers the rear member, as illustrated in FIGURE 8, may be preferred as this will indicate to the assistant at the other end of the boiler whether there is any leakage and he can adjust or relocate his member to see if it is securely seated. Sound telephones or other means of communication can of course be used. The rapidity and ease with which the tubes can be tested are apparent. The testing members 22 and 70 can be simply slid out and slid into next adjacent tubes and the testing of a whole series of tubes can be completed within a relatively short time. Further, this can be done by two men. Any failure of the gage to indicate a maintained vacuum will indicate a leak. Any leakage due to the testing equipment will also be indicated. Such leakage would be due to improper seating of the members 22 and 70 and adjustments of this equipment is easily made to obtain a proper seat. Thus should the operators initially notice that the gages indicate that the pressure is rising, they can rotate or oscillate their respective testing members at which they are stationed and be sure that a firm seat is obtained. Continued rise in pressure will then indicate a faulty tube.

The simplicity of the equipment and its obvious low cost are also an attractive feature. There is little to go wrong, and relatively few operating parts. Furthermore the equipment is compact and can be stored into a relatively small box. The use of vacuum instead of pressure simulates the normal conditions of operation of the condenser and prevents plugging of any openings by sediment which may be in the tubes.

From the foregoing it will be apparent that I have devised a means of testing boiler, condenser and other tubes which is far superior to that heretofore shown. Substantial amounts of time and money will be saved by the adoption of this equipment and method.

While I have shown and described a preferred form of my invention it will be apparent that many changes in details and form can be made, and therefore I claim an exclusive right to all modifications and changes in form coming within the scope of the appended claims.

I claim:

1. A condenser tube testing apparatus comprising a front testing member and a rear testing member, each of said testing members including a hollow element closed at one end and open at its opposite end and adapted to seat on the tube sheets adjacent the ends of a tube to be tested, each of said members comprising a support and posiitoning means projecting outwardly through the open end thereof and attached to said members, said support and positioning means comprising means frictionally engageable with a tube and adapted to support said members on said tube and maintain said members in operative relationship with the tube, means for creating a vacuum within one of said members and a vacuum gage connected to one of said members to indicate the vacuum therein.

2. In a tube tester a cylindrical member having a hollow chamber, said member having a second chamber, a partition extending between said chambers, an opening extending through said partition, a movable valve member seated on one side of said partition, said valve member comprising a sheet of rubbery material, said valve member being of a size larger than said opening and being adapted to alternately cover and uncover said opening, means for maintaining said valve member adjacent said opening, means for connecting the first mentioned member to a tube having an open end comprising a spring supporting element connected to the latter member, one of said chambers having an open end opening outwardly of the latter member, a sealing member extending around said open end and projecting outwardly thereof, said sealing member being adapted to sealingly contact a tube sheet adjacent a tube being tested so as to sealingly connect the chamber having said open end to said tube, said spring element being adapted to support said cylindrical member on the tube through resilient engagement with the latter with said sealing member in said sealing contact.

3. In a tube tester for testing boiler tubes or the like, a member having a hollow interior and two open ends, a partition in said member dividing said member into a first chamber and a second chamber and a conduit connecting said first and second chambers, a valve means positioned on one side of said partition and adapted to open and close said conduit in accordance with variations of pressures in said chambers, said valve means being mounted in said second chamber, means closing one end of said member to form a closed second chamber with said valve means when said valve means seats on said partition and closes said conduit, means for connecting said second chamber to a vacuum pump, means for connecting said first chamber to a vacuum gage, seal means connected to a second end of said member and adapted to bear against a tube sheet and means for frictionally removably securing said member in alignment with the end of a condenser tube to be tested with said sealing member in sealed relation to a tube sheet in which said tube is mounted.

4. The apparatus of the claim 3 in which said means for frictionally connecting said member to said tube comprises a spring element having a pair of legs normally resiliently maintained in an extended position with respect to each other and compressible for insertion into a tube and adapted to engage the walls of said tube.

5. In a tube tester a member adapted to be sealingly engaged with an end of a tube to be tested comprising a hollow element having an open end, a sealing means connected to said open end and adapted to sealingly engage a tube sheet adjacent to and surrounding an end of a tube to be tested, means for resiliently maintaining said element in frictional engagement with said tube with said sealing member surrounding said tube end to provide a sealed connection with said tube comprising a spring member having a pair of legs extending outwardly through said open end of said cylindrical member and adapted to frictionally engage the inner walls of a tube with which said member is associated, said spring member being connected to said cylindrical member.

6. In combination in a tube testing device adapted for determining leaks in a tube, a first member and a second member, each of said members comprising a hollow chamber and each member having an open end connecting said hollow chamber to an exterior member, means for placing the open ended chamber of one of said members in sealed communication with one end of a tube to be tested, means for placing the chamber of the other of said members in sealed connection with an opposite end of the tube including means for frictionally contacting the tubes and supporting each of said members in operative relationship with the tube, means for creating a vacuum within one of said members and a vacuum gauge connected to one of said members for indicating the amount of vacuum within said members and the tube being tested.

References Cited in the file of this patent

UNITED STATES PATENTS

| | | |
|---|---|---|
| 988,917 | Walker | Apr. 4, 1911 |
| 1,323,030 | Dodds | Nov. 25, 1919 |
| 1,414,075 | Dodds | Apr. 25, 1922 |
| 1,464,817 | Hammett | Aug. 14, 1923 |
| 1,608,093 | Fetzer | Nov. 23, 1926 |
| 1,861,542 | McDonald | June 7, 1932 |
| 1,933,322 | Fagan | Oct. 31, 1933 |
| 1,971,065 | Dieter | Aug. 21, 1934 |
| 2,013,402 | Cameron | Sept. 3, 1935 |
| 2,748,598 | Sterns | June 5, 1956 |
| 2,760,367 | Stromberg | Aug. 28, 1956 |

FOREIGN PATENTS

| | | |
|---|---|---|
| 8,571 | Great Britain | 1900 |